(Model.)

E. B. RICH.
SCARFING MACHINE.

No. 409,337. Patented Aug. 20, 1889.

Witnesses:
Celeste P. Chapman
Francis M. Ireland

Inventor:
Elisha B. Rich
By Francis W. Parker
Attorney (Model.)

E. B. RICH.
SCARFING MACHINE.

No. 409,337. Patented Aug. 20, 1889.

Witnesses:
Celesti P. Chapman.
Francis M. Ireland.

Inventor:
Elisha B. Rich.

By Francis W. Parker
Attorney.

(Model.)

3 Sheets—Sheet 3.

E. B. RICH.
SCARFING MACHINE.

No. 409,337. Patented Aug. 20, 1889.

Witnesses:
Celeste P. Chapman.
Francis M. Ireland.

Inventor:
Elisha B. Rich.
By Francis W. Parker
Attorney.

UNITED STATES PATENT OFFICE.

ELISHA B. RICH, OF BOSTON, MASSACHUSETTS.

SCARFING-MACHINE.

SPECIFICATION forming part of Letters Patent No. 409,337, dated August 20, 1889.

Application filed January 9, 1888. Serial No. 260,234. (Model.)

*To all whom it may concern:*

Be it known that I, ELISHA B. RICH, a citizen of the United States, residing at Boston, in the county of Suffolk and State of Massachusetts, have invented a certain new and useful Improvement in Scarfing-Machines, of which the following is a specification.

My invention relates to mechanism for the purpose of grinding knives, saws, shingle-saws, ends of saws to be joined, and the like, where beveled surfaces are to be ground; and it has for its object to provide improved means and mechanism whereby such grinding may be done conveniently and effectually and with the least possible wear on the grinding-wheel. These objects I accomplish by means of the mechanism illustrated in the accompanying drawings, wherein—

Figure 1:
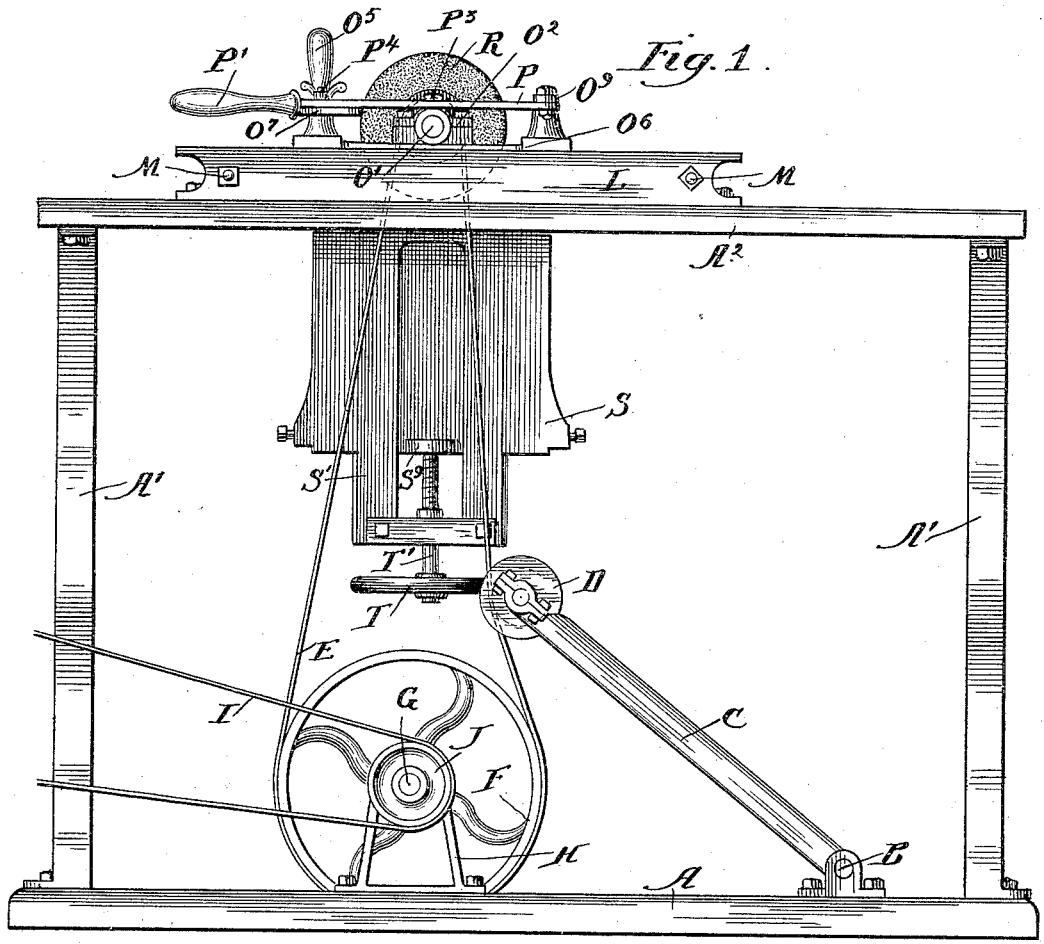
Figures 2, 6:
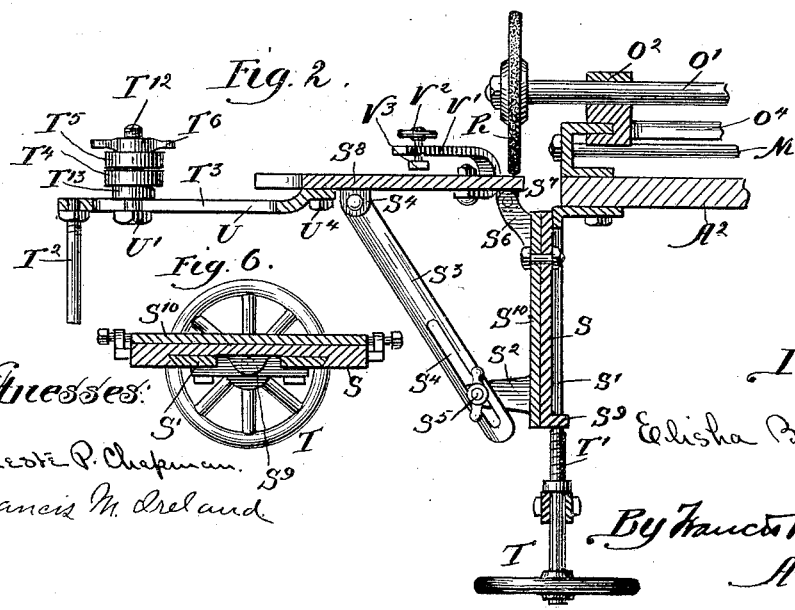
Figure 3:
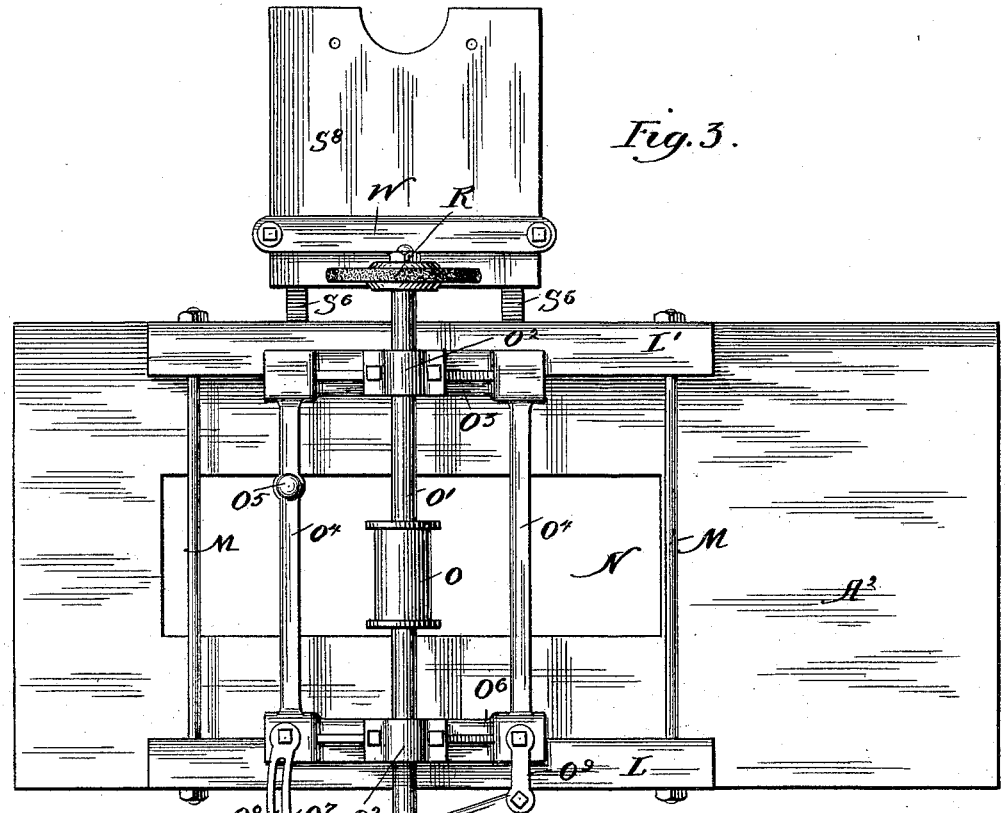
Figure 4:
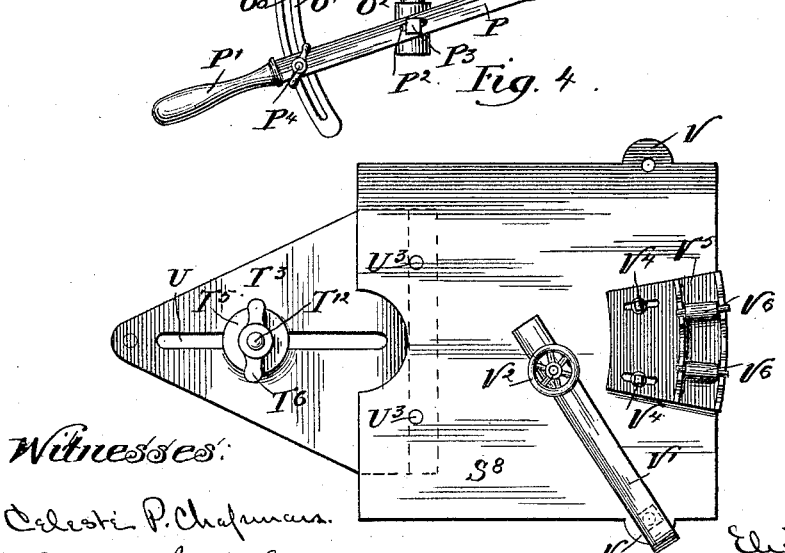
Figure 5:
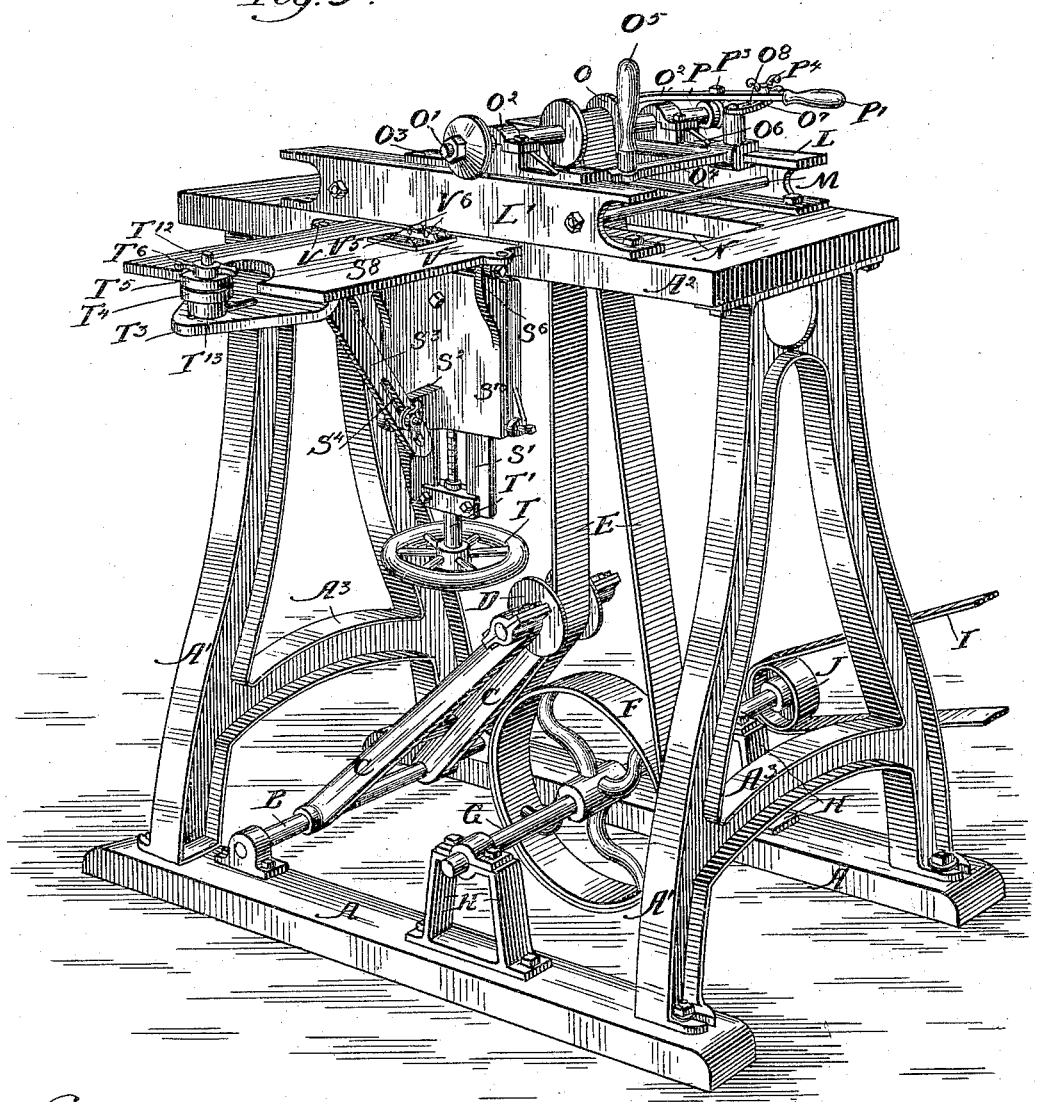

Figure 1 is a side view of my invention with parts removed. Fig. 2 is a cross-section and detail of the grinding-table with certain parts removed. Fig. 3 is a plan view of the machine with parts removed. Fig. 4 is a plan view of the secondary table, adapted for grinding shingle-saws, with certain parts removed. Fig. 5 is a perspective of the machine. Fig. 6 is a cross-section of the line 6 6.

Like parts are indicated by the same letter in all the figures.

A is the base of the frame, upon which rise the standards A', and which supports the table $A^2$.

$A^3$ $A^3$ are brace-rods.

On the base is placed the pivot-rod B, to which is pivoted the arms C, carrying the tightening-roller D, which rests against the belt E. This belt is driven from the pulley F on the shaft G, which shaft is supported on the standards H and driven by means of the belt I, working on the pulley J.

L and L' are guideways supported on the table $A^2$. They are connected by the cross-rods M and M, and the table $A^2$ has an aperture N, through which the belt E passes. This belt proceeds to a pulley O, which is secured upon the shaft O'. It may be rigid with said shaft, or it may be keyed thereto, so as to rotate therewith, but slide thereon. The shaft O' is journaled in the boxings $O^2$ $O^2$, which are supported on the slides $O^3$ $O^6$. These slides are united by the cross-bars $O^4$ $O^4$, from one of which cross-rods rises the handle $O^5$. These slides $O^3$ and $O^6$ rest upon and slide along the guideways L and L' in the direction of the length of the table. Projecting from one end of the slide $O^6$ is the arc-shaped piece $O^7$ with the arc-shaped slot $O^8$. The slides $O^3$ and $O^6$, together with the rods $O^4$ $O^4$, constitute the frame, upon which the shaft O' is mounted so as to reciprocate, and which said frame is itself formed to slide upon the ways L L'. From the other end of the slide $O^6$ projects the link $O^9$, to which is pivoted the bar P, at the outer end of which is the handle P'. This bar has midway a slot $P^2$, through which projects the pin $P^3$ from the shaft O'. It is also provided with the pin $P^4$, which projects into the slot $O^8$.

R is the grinding-wheel supported on the shaft O'.

S is a sliding plate secured so as to be vertically adjustable along the pendent frame S', which is secured to the frame $A^2$. This sliding plate S is made to reciprocate by means of the hand-wheel T in the usual manner. The hand-wheel is on a rod T', screw-threaded on a pendent frame. The plate S is provided with a dovetailed slot to receive the frame S', and has secured to it and forming a part of it the face-plate $S^{10}$. The lug $S^9$ on the plate S engages the end of the rod T'. Projecting from the lower end of plate $S^{10}$ is the arm $S^2$, to which is secured the link $S^3$, which is provided with the long slot $S^4$, so as to be adjustably secured to the bar $S^2$ by means of the lock-nut $S^5$. The link $S^3$ is pivoted to the lug $S^4$ on the table. The slide-plate S has at its upper end the additional arm $S^6$, pivoted to the lug $S^7$. The lugs $S^4$ and $S^7$ are secured to the grinding-table $S^8$, which closely approaches the edge of the table $A^2$ and lies beneath the grinding-wheel R. This table at its outer extremity may have the rod $T^2$ to serve as an additional support.

Secured to the auxiliary table $T^3$ is a standard-rod $T^{12}$, provided with a series of washers and lock-nuts $T^{13}$ $T^4$ $T^5$ $T^6$. The rod $T^2$ is adjustably secured in the slot U by means of the nuts U' and $T^{13}$, so that it can be adjusted with reference to its distance from the grinding-wheel. The table $T^3$ is secured to the extremity of the table $S^8$ by means of the bolts $U^3$ $U^3$ and the nuts $U^4$. The table $S^8$ is provided on each side with the lugs V V, to one of which is secured the U-shaped arm V', having at its outer extremity the hand-wheel $V^2$ and clamping-block $V^3$. Secured upon the table $S^8$ by the bolts $V^4$ $V^4$ is the plate $V^5$, carrying the friction-rollers $V^6$ $V^6$. The U-shaped piece $V'$ may be set at any angle to $S^8$, and it is secured by the lock-nut $V^7$ below the table $S^8$. The table is described as thus arranged for beveling a shingle-saw, as will be hereinafter explained; but when the machine is used for scarfing or grinding plain bevels the table T T is dispensed with and the clamp W is secured to the lugs V V.

The use and operation of my invention are as follows:

The machine is set up as shown in Fig. 1, and is supplied with power through the belt which causes the shaft G to rotate. This sets the belt E in operation, and it is kept sufficiently tight for the work by means of the weight of the tightening-pulley D, which always rests upon said belt. This belt passes over and drives the pulley O, thus driving the shaft $O'$ and the grinding-wheel R. By means of the rod which terminates in the handle $p'$ the shaft O may be reciprocated in its bearings, so as to carry the grinding-wheel R back and forth in a line at right angles to the length of the table and across the surface to be ground. The object of this is to prevent the wheel from wearing off unevenly, for if the square end of a saw is to be ground for the purpose of uniting two pieces it will readily be seen that when the grinding begins to take place along the corner of the end or upon a comparatively sharp-edged surface, and if the grinding-wheel should be left to grind in one position it would rapidly become itself unevenly worn. The operator, therefore, by swinging the handle $P'$ in and out from the table reciprocates the shaft $O'$, and thus carries the grinding-wheel back and forth across the surface to be ground. If he desires to lock the handle in any desired position, he may do so by means of the arc-shaped slot. It is also necessary that the grinding-wheel should pass over the surface to be ground back and forth in a direction parallel with the end of the table $A^2$, so as to grind over the entire surface, which may sometimes be as long as the width of the table $S^8$. This is accomplished by power being applied to the handle $O^5$ on one of the rods $O^4$, which rods connect the sliding pieces $O^3$ $O^6$. On these pieces, as will be remembered, the shaft $O'$ is supported, so that when they are moved back and forth along the slides L $L'$ the shaft and the grinding-wheel are carried back and forth so that the wheel grinds the entire surface. Thus by joining the two motions the grinding-wheel may be made to pass over the entire surface to be ground, thus grinding the saw evenly and at the same time wearing the wheel evenly. If a band-saw is to be joined, as in the case of scarfing, the portion to be ground is placed on the table $S^8$ and carried into the proper position under the grinding-wheel R. The grinding-wheel R is then clamped into position by the cross-bar W. If a shingle-saw is to be ground so as to have a continuous taper from its edge toward the center for a considerable distance, it is done by the appliances shown in Fig. 4. The saw is clamped upon the washer $T^4$ by lock-nuts and washers, and the standard-rod $T^{12}$ is set at such a position as to bring the proper portion of the saw directly over the friction-rollers $V^6$. The slot U is designed to permit the machine to be used to grind saws having various radii. In order that the saw may be held in position and may not be caused by the motion of the grinding-wheel to rotate too rapidly, and thus lose the effect of the grinding-wheel, I have employed the clamping-frame $V'$ and the clamping-block $V^3$. Thus the saw may be clamped against the friction rollers $V^6$ $V^6$ so as to retard its travel and permit the grinding-wheel to wear off its surface at the proper point. The table $S^8$ is raised or lowered by any ordinary mechanism—as, for instance, that shown—and it is adjusted as to pitch by means of the slotted arm $S^3$ and lock-nuts and bolt $S^5$. Thus any desired bevel is given to the surface to be ground.

Having thus described my invention, what I claim, and desire to secure by means of Letters Patent, is as follows:

1. In a machine for lap-grinding, the combination of the grinding-wheel and its supporting-shaft, with a frame upon which the shaft may reciprocate, and which frame is formed to slide in the direction at right angles to the shaft, with two handles, one on the frame and one connected to the shaft, so that a compound motion can be given to the grinding-wheel, and a vertically and angularly adjustable table beneath said grinding-wheel to support the saw, and an auxiliary table attached to said last-mentioned table and adapted to hold circular saws, so that the machine may be used to bevel circular saws or lap-grind band-saws.

2. The combination of a grinding-wheel and stand, with a table secured to the latter and vertically and angularly adjustable thereon, with an auxiliary table secured to the outer end of the latter table and provided with a central securing device, so that by the co-operation of the two tables either band or circular saws may be brought under the grinding-wheel to be beveled.

3. The combination of a grinding-wheel and a frame on which it is supported, with a table secured thereto, so as to be vertically and angularly adjustable, an auxiliary table attached to said first-mentioned table and provided with a central clamp to hold circular saws, a friction-plate on the first-mentioned table provided with rollers radial to the clamping device on the auxiliary table, and a clamp upon said first-mentioned table, so as to hold the edge of a circular saw upon such friction-plate.

ELISHA B. RICH.

Witnesses:
FRANCES W. PARKER,
CORA L. CADWALLADER.